United States Patent [19]
Bell et al.

[11] Patent Number: 5,835,739
[45] Date of Patent: Nov. 10, 1998

[54] METHOD AND APPARATUS FOR MAINTAINING TRANSACTION ORDERING AND ARBITRATING IN A BUS BRIDGE

[75] Inventors: D. Michael Bell, Beaverton; Mark A. Gonzales, Portland; Susan S. Meredith, Hillsboro, all of Oreg.

[73] Assignee: Intel Corporation, Santa Clara, Calif.

[21] Appl. No.: 889,756

[22] Filed: Jul. 10, 1997

Related U.S. Application Data

[63] Continuation of Ser. No. 639,184, Apr. 26, 1996, abandoned, which is a continuation of Ser. No. 246,776, May 20, 1994, Pat. No. 5,546,546.

[51] Int. Cl.$^6$ .................................................... G06F 13/00
[52] U.S. Cl. ........................................... 395/308; 395/309
[58] Field of Search ................................... 395/306, 308, 395/309, 292, 285, 280

[56] References Cited

U.S. PATENT DOCUMENTS

| | | |
|---|---|---|
| 5,269,005 | 12/1993 | Heil et al. . |
| 5,307,505 | 4/1994 | Houlberg et al. . |
| 5,327,570 | 7/1994 | Foster et al. . |
| 5,333,276 | 7/1994 | Solari . |
| 5,369,748 | 11/1994 | McFarland et al. . |

FOREIGN PATENT DOCUMENTS 0 524 684 A2  1/1993  European Pat. Off. .

OTHER PUBLICATIONS

Popescu, Val, Merle Schultz, John Spracklen, Gary Gibosn, Bruce Lightner and David Isaman, "The Metaflow Architecture", IEEE Micro, Jun. 1991, pp. 10–13 and 63–73.
Supplementary European Search Report dated Jul. 17, 1997 (2 pgs).

*Primary Examiner*—Glenn A. Auve
*Attorney, Agent, or Firm*—Blakely, Sokoloff, Taylor & Zafman

[57] ABSTRACT

A bus bridge situated between two buses includes two queues: an outbound request queue and an inbound request queue. Requests originating on the first bus which target a destination on the second bus are placed into the outbound request queue. Requests originating on the second bus which target a destination on the first bus are placed into the inbound request queue. A transaction arbitration unit (TAU) within the bridge maintains transaction ordering and avoids deadlocks. The TAU determines whether requests can be placed in the inbound request queue. The TAU also determines whether requests originating on the first bus can be responded to immediately or whether the agent originating the request must wait for a reply. In addition, the TAU includes logic for determining whether a request in the outbound request queue can be executed on the second bus. The TAU determines whether posting to the inbound request queue is enabled or disabled; whether any posted transactions exist in the inbound request queue; and whether ownership of the second bus is available.

28 Claims, 10 Drawing Sheets

METHOD AND APPARATUS FOR MAINTAINING TRANSACTION ORDERING AND ARBITRATING IN A BUS BRIDGE

This is a continuation of application Ser. No. 08/639,184, filed Apr. 26, 1996, now abandoned, which is a continuation of application Ser. No. 08/246,776, filed May 20, 1994, U.S. Pat. No. 5,546,546.

BACKGROUND OF THE INVENTION

1. Field of the Invention

The present invention pertains to the field of data transfer in a computer system. More particularly, this invention relates to transfer of data between multiple buses using bus bridges.

2. Background

Modern computer systems generally include multiple agents, such as microprocessors, storage devices, display devices, etc. which are interconnected via a system bus. The system bus operates to transfer address, data and control signals between these agents. Some modem computer systems employ multiple buses, in which various agents are coupled to one or more buses. Typically, each agent is coupled to a single bus.

Bus bridges are often utilized in multiple-bus systems to connect the buses and thereby allow agents coupled to one bus to access agents coupled to another bus. The function of the bridge typically involves transferring commands between two buses. The commands transferred by the bus bridge frequently have data associated with them (e.g., read or write commands).

One problem which frequently arises in computer systems with multiple agents is the need to preserve transaction ordering. Support for transaction ordering implies that if an agent writes to location A in memory followed by a write to location B in memory, another agent cannot read the new data in location B and stale (i.e., old) data in location A. A number of software algorithms require a producer-consumer relationship and thus depend on this support to ensure proper functionality. For example, in a system comprising multiple processors, assume that processor P1 is a producer of information and processor P2 is a consumer of information. P1 performs a write operation W1 to location 1 followed by a write operation W2 to location 2. Location 2 contains a flag variable that signals that the data in location 1 is valid. Processor P2 continuously performs a read operation R2 on location 2 until the flag becomes valid. After the flag is observed valid, P2 performs a read operation R1 on location 1 to read the data. In order for this algorithm to successfully execute in a multiprocessor system, the order in which W1 and W2 are written by processor P1 should be the same order in which R1 and R2 appear to be updated to processor P2.

A bus bridge in a multiple-bus system must address the problem of transaction ordering. In the example above, processors P1 and P2 may be coupled to one bus while locations 1 and 2 are coupled to a second bus, and a bus bridge is supporting access between the two buses. Thus, the bus bridge must ensure that transaction ordering is maintained. That is, the order in which W1 and W2 are written by an agent(s) should be maintained by the bus bridge.

One method of maintaining transaction ordering is shown in FIG. 1. A bus bridge 100 is shown which interfaces between two buses: a first system bus 102 and a second system bus 104. An agent 130 is coupled to system bus 102 and an agent 140 is coupled to system bus 104. In this system, bus bridge 100 contains a first queue 110 which contains requests issued on system bus 102 which target an agent on system bus 104. Bus bridge 100 also contains a second queue 115 which contains requests issued on system bus 104 which target an agent on system bus 102. A temporary storage buffer 120 may also be contained in bridge 100.

Bridge 100 transfers commands between buses 102 and 104. For example, assume agent 130 issues a request targeting agent 140. This request is received by bridge 100 and placed in queue 110. Alternatively, if agent 140 issues a request targeting agent 130, the request is placed in queue 115.

Data transferred between buses is stored in temporary storage buffer 120. For example, a read request placed into queue 110 is executed on system bus 104. When the target agent responds, the read data is placed in temporary storage buffer 120. The agent issuing the original request then knows the data to satisfy its request is contained in temporary storage buffer 120.

In the prior art system shown, both queues 110 and 115 contain pending requests and transfer the requests onto the appropriate buses. When a write request is issued by either agent 130 or agent 140, bridge 100 forces transaction ordering by preventing any read transactions from being placed in the opposite queue until the queue with the write request is flushed (i.e., the write transaction is executed on the targeted bus). For example, if a write operation were placed in queue 115, bridge 100 would prevent any read operations from being placed in queue 110 until queue 115 is flushed.

Although this prior art method effectively resolves the transaction ordering problem, it does not do so efficiently because it prevents the use of one queue while the other is being flushed. As described above, transactions are not placed in one queue while the other queue contains a write operation.

Thus, it would be advantageous to provide a system which resolves the transaction ordering problem in an effective and efficient manner. The present invention provides such a solution.

In addition to maintaining transaction ordering, the bus bridge should also avoid deadlock situations within the bridge. Deadlock situations typically require at least a temporary suspension of system operation, if not an entire system reset. A deadlock situation arises, for example, if the bridge contains two requests, one targeting an agent on the first bus and the second targeting an agent on the second bus, and neither request can be executed until the other is satisfied. Thus, the deadlock prevents the bridge from operating properly.

Thus, it would be advantageous to provide a system which prevents the occurrence of deadlocks within the bus bridge, while at the same time maintaining efficient operation. As will be seen, the present invention provides such a solution.

SUMMARY OF THE INVENTION

The present invention comprises a method and apparatus for maintaining transaction ordering and arbitrating in a bus bridge. The bus bridge interfaces between two separate buses and includes two queues: an outbound request queue and an inbound request queue. Requests originating on the first bus which target a destination on the second bus (termed "outbound requests") are transferred through the outbound request queue, whereas requests originating on the second bus which target a destination on the first bus (termed "inbound requests") are transferred through the inbound request queue.

The bus bridge includes a transaction arbitration unit (TAU) which maintains transaction ordering and prevents deadlocks within the bridge. The TAU contains logic for determining whether requests can be placed in the inbound request queue. If an inbound request cannot be placed in the queue, then a response is returned to the originating agent to retry the request at a later time. The TAU also includes logic for determining whether an outbound request can be committed to, or whether the first bus should be stalled to wait for a reply.

An outbound or inbound request which is committed to is immediately responded to, i.e., the originating agent receives an immediate response. However, a request which is not committed to waits for a reply; i.e., the originating agent waits for the request to be attempted on the target bus.

The TAU also includes logic for determining whether a request can be executed on the target bus. In making this determination, the TAU determines whether posting to the appropriate queue is enabled or disabled (i.e., the inbound request queue for transactions originating on the second bus and the outbound request queue for transactions originating on the first bus), whether any posted transactions exist in the opposite request queue, and whether ownership of the target bus is available.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

System of the Present Invention

Figure 1:
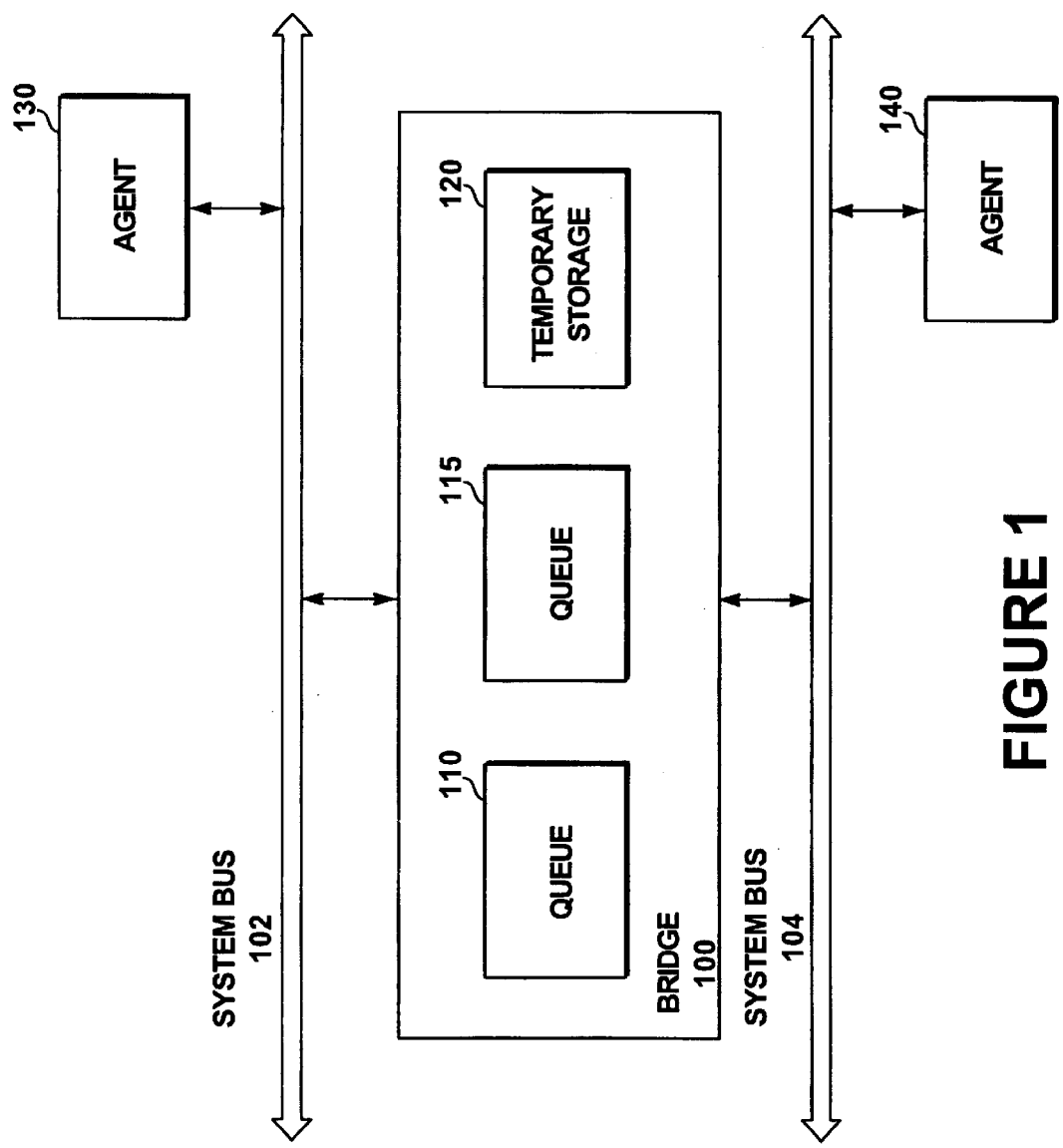
FIG. 1 is a block diagram of a prior art implementation of a bus bridge in a computer system.
Figure 2:
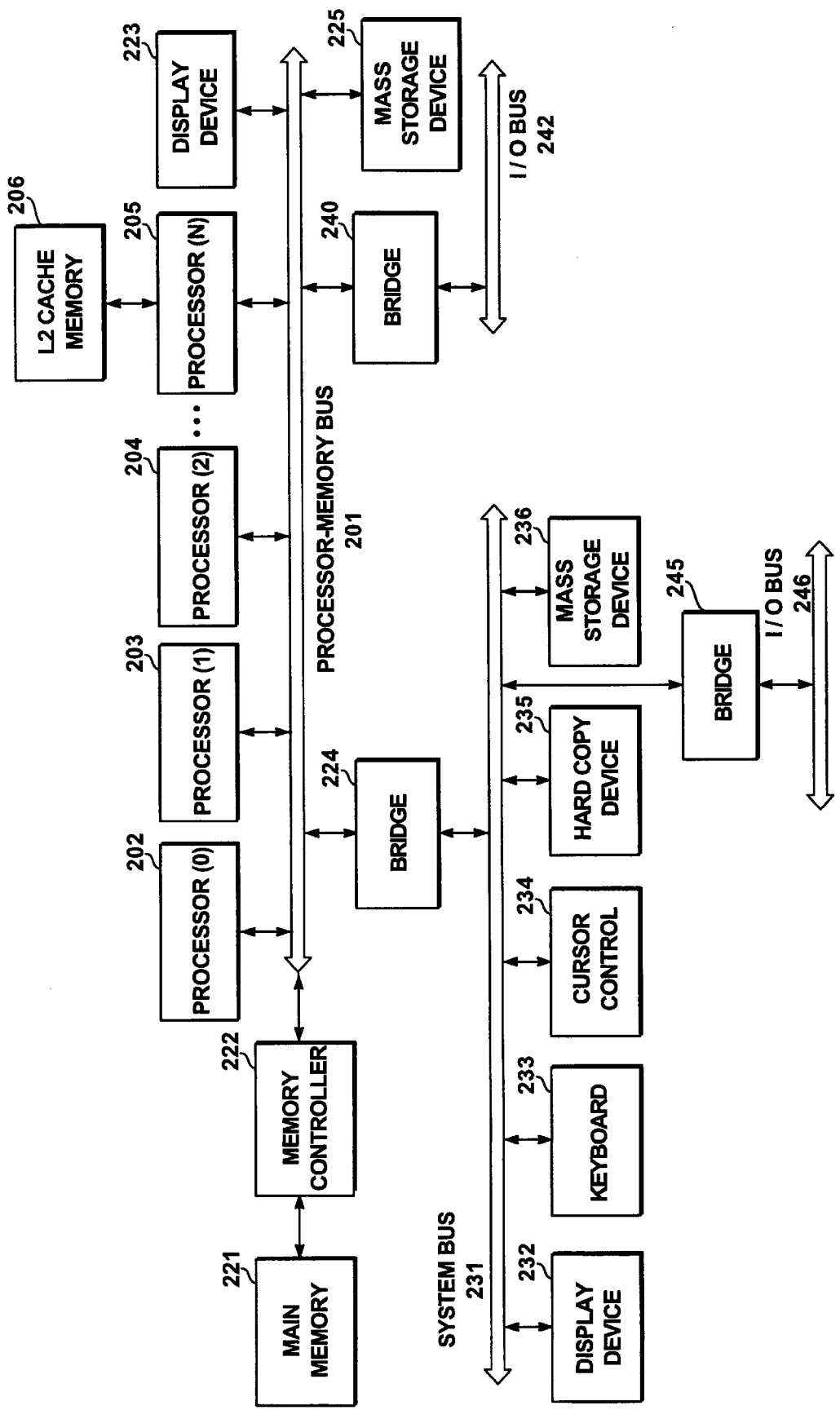
FIG. 2 shows an overview of an example multiprocessor computer system of the present invention.

FIG. 2 shows an overview of an example multiprocessor computer system of the present invention. The computer system generally comprises a processor-memory bus or other communication device 201 for communicating information between one or more processors 202, 203, 204 and 205. Processor-memory bus 201 includes address, data and control buses. Processors 202 through 205 may include a small, extremely fast internal cache memory, commonly referred to as a level one (L1) cache memory for temporarily storing data and instructions on-chip. In addition, a bigger, slower level two (L2) cache memory 206 can be coupled to a processor, such as processor 205, for temporarily storing data and instructions for use by processor 205. In one embodiment, the computer system of the present invention includes Intel® architecture microprocessors as processors 202 through 205; however, the present invention may utilize any type of microprocessor architecture, or any of a host of digital signal processors or other agents.

It is appreciated that processor 202, 203, or 204 may also comprise a parallel processor, such as a processor similar to, or the same as, processor 205. Alternatively, processor 202, 203, or 204 may comprise a co-processor, such as a digital signal processor. In addition, processors 202 through 205 may include processors of different architecture types.

The processor-memory bus 201 provides system access to the memory and input/output (I/O) subsystems. A memory controller 222 is coupled with processor-memory bus 201 for controlling access to a random access memory (RAM) or other dynamic storage device 221 (commonly referred to as a main memory) for storing information and instructions for processors 202 through 205. A mass data storage device 225, such as a magnetic disk and disk drive, for storing information and instructions, and a display device 223, such as a cathode ray tube (CRT), liquid crystal display (LCD), etc., for displaying information to the computer user may be coupled to processor-memory bus 201.

An input/output (I/O) bridge 224 may be coupled to processor-memory bus 201 and system I/O bus 231 to provide a communication path or gateway for devices on either processor-memory bus 201 or I/O bus 231 to access or transfer data between devices on the other bus. Essentially, bridge 224 functions as an interface between the system I/O bus 231 and the processor-memory bus 201.

In addition, an I/O bus 242 may be coupled to processor-memory bus 201 via bridge 240. I/O bus may be coupled to additional peripheral devices, such as devices 232 through 236, coupled to system I/O bus 231.

In one embodiment of the present invention I/O bus 246 is coupled to system I/O bus 231 via bridge 245. I/O bus 246 may be coupled to additional peripheral devices, such as devices 232 through 236 coupled to system I/O bus 231. In one implementation, I/O bus 246 operates on a different standard (e.g., EISA) than system I/O bus 231 (e.g., PCI).

I/O bus 231 communicates information between peripheral devices in the computer system. Devices that may be coupled to system bus 231 include a display device 232, such as a cathode ray tube, liquid crystal display, etc., an alphanumeric input device 233 including alphanumeric and other keys, etc., for communicating information and command selections to other devices in the computer system (e.g., processor 202) and a cursor control device 234 for controlling cursor movement. Moreover, a hard copy device 235, such as a plotter or printer, for providing a visual representation of the computer images and a mass storage device 236, such as a magnetic disk and disk drive, for storing information and instructions may also be coupled to system bus 231.

It should be understood that in some implementations it may not be required to provide a device for displaying information. Certain implementations of the present invention may include additional processors or other components. Additionally, certain implementations of the present invention may not require nor include all of the above components. For example, processors 202 through 204, display device 223, I/O bus 242, or mass storage device 225 may not be coupled to processor-memory bus 201. Furthermore, some of the peripheral devices shown coupled to system I/O bus 231 may be coupled to processor-memory bus 201.

In the present invention, bus transactions occur on the processor buses (e.g., processor-memory bus 201 of FIG. 2) in the computer system in a pipelined manner. That is, multiple bus transactions may be pending at the same time, wherein each is not fully completed. Therefore, when a requesting agent begins a bus transaction by driving an address onto the bus, the bus transaction may be only one of a number of bus transactions currently pending. Although bus transactions are pipelined, the bus transactions in the present invention do not have to be fully completed in order, such that the present invention performs split bus transactions. Therefore, the present invention allows for completion replies to requests to be out-of-order. An example bus protocol for out-of-order replies is described in U.S. patent application Ser. No. 07/085,541, filed Jun. 30, 1993, entitled "Method and Apparatus for Performing Bus Transactions in a Computer System", which application is assigned to the assignee of the present invention.

The present invention accommodates for split transactions by essentially splitting a bus transaction into two independent transactions. The first transaction involves a request for data (or completion signals) by a requesting agent and a response by the responding agent. The request may be comprised of the sending of an address on the address bus and a first token. The response may include the sending of the requested data (or completion signals) if the responding agent is ready to respond. In this case, the bus transaction ends. However, if the responding agent is not ready to supply the request (i.e., the data or completion signals), the response may include the sending of a second token. In this case, the second transaction comprises the resending of the second token with the requested data (or completion signals) by the responding agent to the requesting agent, such that the requesting agent receives the originally requested data to complete the transaction.

If the responding agent is not ready to complete the bus transaction, then the responding agent sends a deferred response over the bus at its appropriate response time. The requesting agent receives the deferred response. When the responding agent is ready to complete the deferred bus transaction, the responding agent arbitrates for ownership of the bus. Once bus ownership is obtained, the responding agent sends a deferred reply including a second token on the bus. The requesting agent monitors the bus and receives the second token as part of the deferred reply. In the present invention, the requesting agent latches the second token. The requesting agent then determines whether the second token sent from the responding agent matches the first token. If the requesting agent determines that the second token from the responding agent does not match the first token (which the requesting agent generated), then the data on the bus (or the completion signal) is ignored and the requesting agent continues monitoring the bus. If the requesting agent determines that the second token from the responding agent does match the first token, then the data on the bus (or the completion signals) is the data originally requested by the requesting agent and the requesting agent latches the data on the data bus.

In one embodiment of the present invention, bus activity is hierarchically organized into operations, transactions, and phases. An operation is a bus procedure that appears atomic to software such as reading a naturally aligned memory location. Executing an operation usually requires one transaction but may require multiple transactions, such as in the case of deferred replies in which requests and replies are different transactions. A transaction is the set of bus activities related to a single request, from request bus arbitration through response-initiated data transfers on the data bus. In this embodiment, a transaction is the set of bus activities related to a single request, from request bus arbitration through response-initiated data transfers on the data bus.

A transaction contains up to six distinct phases. However, certain phases are optional, based on the transaction and response type. A phase uses a particular signal group to communicate a particular type of information.

These phases are:

Arbitration Phase

Request Phase

Error Phase

Snoop Phase

Response Phase

Data Transfer Phase

In one mode, the Data Transfer Phase is optional and used if a transaction is transferring data. The data phase is request-initiated, if the data is available at the time of initiating the request (e.g., for a write transaction). The data phase is response-initiated, if the data is available at the time of generating the transaction response (e.g., for a read transaction). A transaction may contain both a request-initiated data transfer and a response-initiated data transfer.

Figure 3:
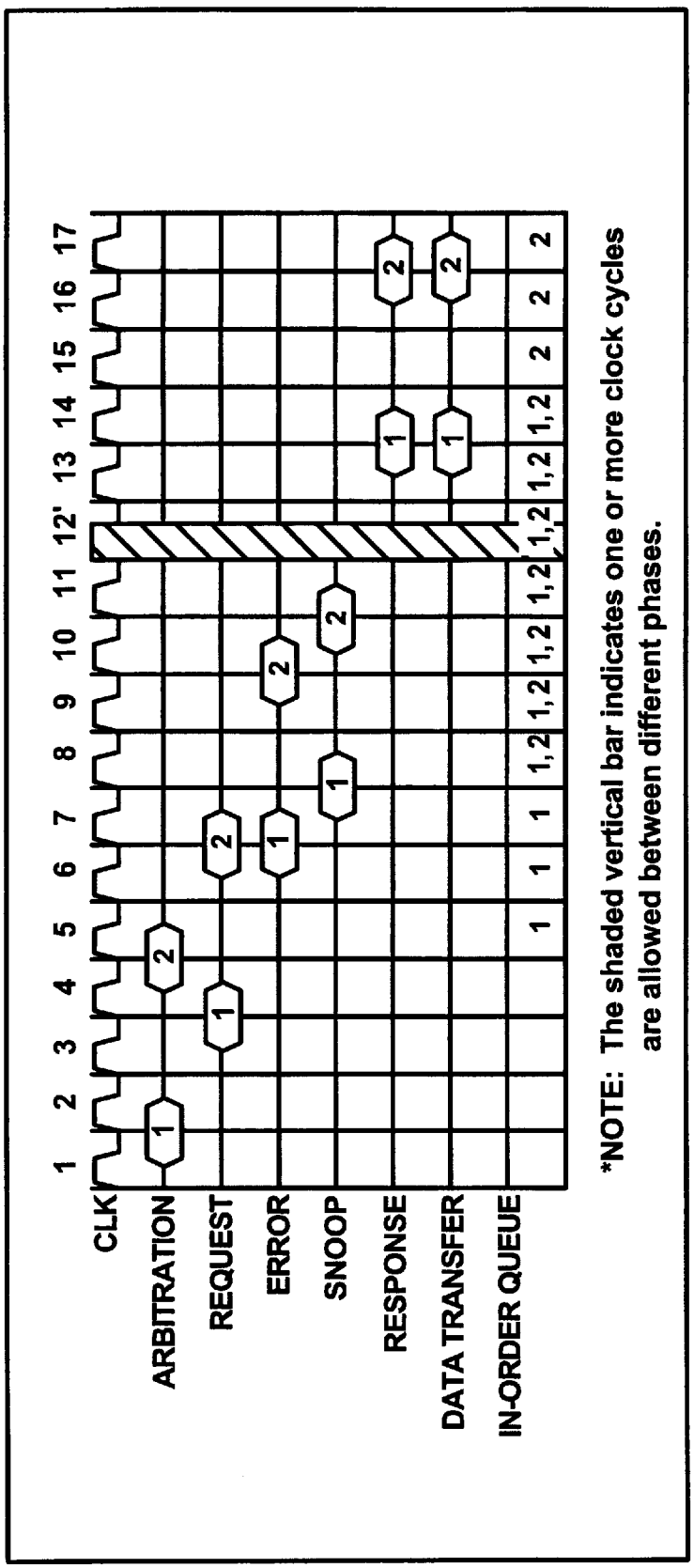
FIG. 3 is a timing diagram of two bus transactions for one embodiment of the present invention.

Additionally, different phases from different transactions can overlap, thereby pipelining bus usage and improving bus performance. FIG. 3 shows exemplary overlapped request/response phases for two transactions. Referring to FIG. 3, note that every transaction begins with an Arbitration Phase, in which a requesting agent becomes the bus owner. The second phase is the Request Phase in which the bus owner drives a request and address information on the bus. After the Request Phase, a new transaction enters a first-in-first-out (FIFO) queue, the In-Order Queue. All bus agents, including the requesting agent, maintain identical In-Order Queues and add each new request to those queues. In FIG. 3 for example, request 1 is driven in CLK3, observed in CLK4, and in the In-Order Queue beginning in CLK5. The third phase of a transaction is an Error Phase, three clocks after the Request Phase. The Error Phase indicates any immediate errors triggered by the request. The fourth phase of a transaction is a Snoop Phase, four or more clocks from the Request Phase. The Snoop Phase indicates if the cache line accessed in a transaction is valid or modified (dirty) in any agent's cache. The Snoop Phase also indicates whether a transaction will be completed in-order or may be deferred for possible out-of-order completion.

Transactions proceed through the In-Order Queue in FIFO order. The topmost transaction in the In-Order Queue enters the Response Phase. The Response Phase indicates whether the transaction failed or succeeded, whether the response is immediate or deferred, and whether the transaction includes data phases.

If a transaction contains a response-initiated data phase, then it enters data transfer along with the response phase, the transaction is removed from the In-Order Queue at the completion of its Response Phase and (an optional) response-initiated Data Transfer Phase. As shown in FIG. 3, transaction 1 is removed from the In-Order Queue effective in CLK15.

Due to the split-transaction nature of the bus described above, it can be seen that multiple transactions may be outstanding at any given time. That is, multiple requests may have been issued for which no replies have been returned. In one embodiment of the present invention, each agent on the bus can have up to eight transactions outstanding.

Bus Bridge

Figure 4:
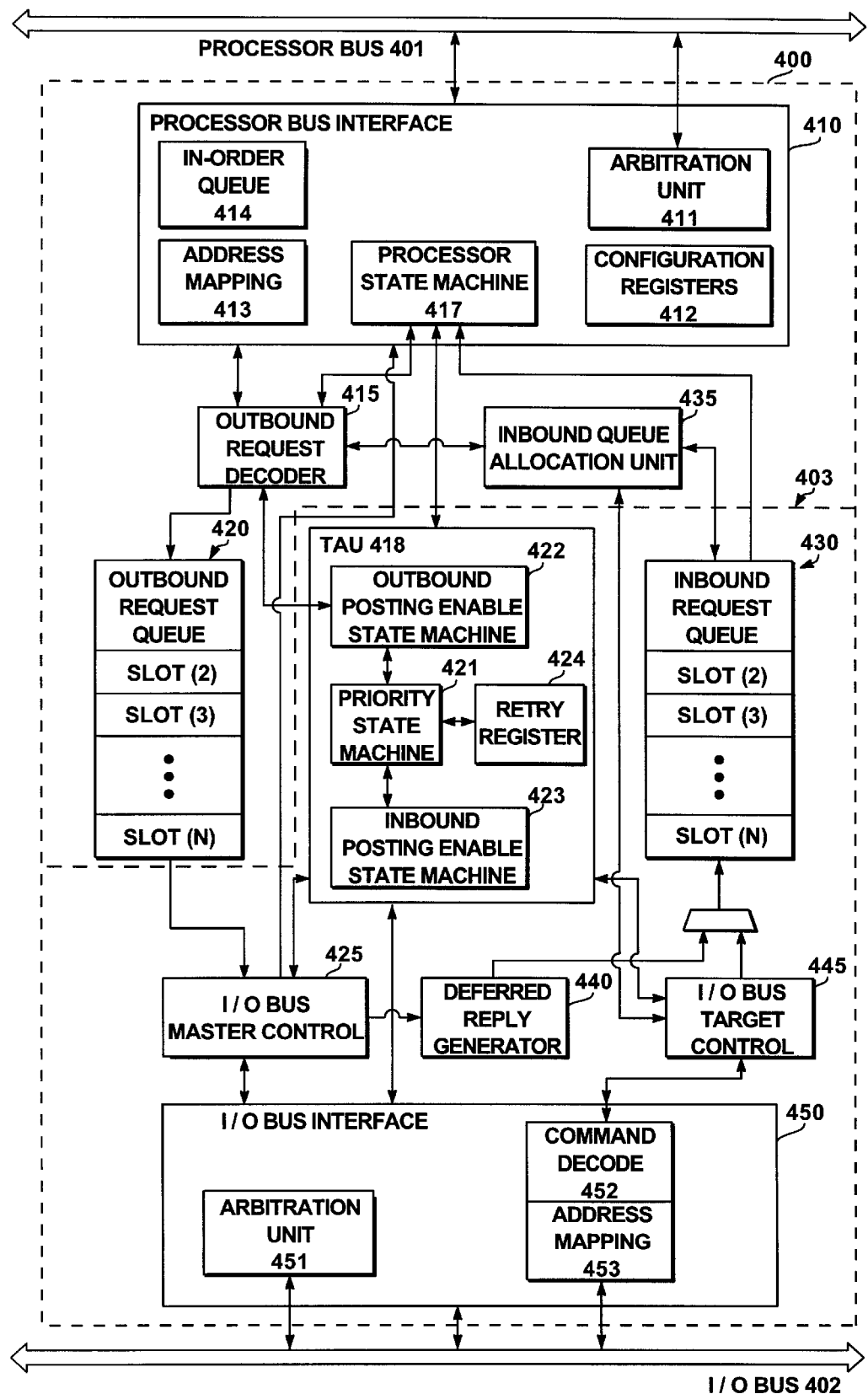
FIG. 4 is an exemplary block diagram of the bus bridge of one embodiment of the present invention.

FIG. 4 is an exemplary block diagram of the bus bridge of one embodiment of the present invention. In one implementation, bus bridge 400 of FIG. 4 is bridge 224 of FIG. 2. In one embodiment of the present invention, I/O bus 402 operates according to the well-known PCI bus standard. However, it should be noted that I/O bus 402 may operate according to any of a wide variety of standards, such as the well-known EISA, ISA, or VESA bus standards.

In the discussion to follow, bus bridge 400 is discussed as being connected to a processor bus and an I/O bus. It should be understood by those skilled in the art, however, that the examples and embodiments discussed below apply equally to interconnect any two buses, not only a processor bus and an I/O bus.

Bus interface 410 includes an arbitration unit 411, configuration registers 412, address mapping logic 413, In-Order Queue 414, and a processor state machine 417. Arbitration unit 411 controls bus bridge 400's arbitration for access to processor bus 401. The arbitration for access to processor bus 401 may be performed in any of a wide variety of conventional manners. Configuration registers 412 provide configuration values for bridge 400's operation within the computer system. These values include, for example, the bridge ID for bridge 400 and error-checking protocols for processor bus 401 and I/O bus 402. Processor state machine 417 transfers requests between inbound request queue 430 and processor bus 401, as discussed in more detail below.

Address mapping logic 413 translates addresses received from I/O bus 402 to the proper format for processor bus 401, if necessary. That is, in systems where processor bus 401 and I/O bus 402 use different standards, a request from I/O bus 402 may target an address which is not in the proper format to be placed on processor bus 401. Address mapping logic 413 performs the translation so that the address conforms to the standards for processor bus 401. This translation is based on the standards of the two buses and is performed in a conventional manner.

Bridge 400 also includes outbound request queue 420 which receives requests from processor bus 401 via bus interface 410 and outbound request decoder 415. In one implementation, queue 420 is a conventional first-in-first-out (FIFO) queue. Outbound request decoder 415 determines whether bridge 400 commits to a request (i.e., either defers the request or posts it) and responds to the originating agent on processor bus 401 indicating whether the request was committed. Decoder 415 then places the request into outbound request queue 420. In one embodiment of the present invention, outbound request queue 420 comprises four slots for containing up to four outbound transactions.

In one embodiment of the present invention, each slot of outbound request queue 420 includes a tag field. This tag field indicates information such as whether the request in a particular slot is part of a locked transaction, or whether bridge 400 committed to the transaction.

Transactions are removed from the top of outbound request queue 420 by I/O bus master control 425 and issued onto I/O bus 402 via I/O bus interface 450. Upon receipt of a reply from the target agent on I/O bus 402, I/O bus master control 425 returns the reply to bus interface 410 either directly or via inbound request queue 430. If bridge 400 committed the transaction, then the reply is placed into inbound request queue 430. If bridge 400 did not commit the transaction, then the reply is returned directly to interface 410. In one embodiment of the present invention, whether bridge 400 committed to the transaction is contained in the tag field associated with the request in outbound request queue 420. Thus, bus master control 425 determines whether to place the reply in inbound request queue 430 or return it directly to interface 410 based on this tag field.

I/O bus interface 450 includes an arbitration unit 451, command decode logic 452, and address mapping logic 453. Address mapping logic 453 translates addresses received from I/O bus master control 425 in processor bus 401 format to the proper format for I/O bus 402. This translation is analogous to the translation performed by address mapping logic 413 described above. Arbitration unit 451 controls bridge 400's requests for access to I/O bus 402. Arbitration unit 451 operates in a conventional manner, as determined by the arbitration protocol for I/O bus 402.

Command decode logic 452 translates commands between processor bus 401 format and I/O bus 402 format, analogous to address mapping logic 453. In one embodiment of the present invention, processor bus 401 and I/O bus 402 utilize different protocols. Thus, commands issued on processor bus 401 are first translated before being executed on I/O bus 402. In one implementation, command decode 452 performs this translation. This translation may be performed using any of a wide variety of conventional techniques understood by those skilled in the art.

Inbound request queue 430 transfers requests from I/O bus 402 to processor bus interface 410. These requests originate on I/O bus 402 and are transferred to queue 430 via bus interface 450 and I/O bus target control 445. In one implementation, queue 430 comprises four slots for containing up to four outbound transactions and operates as a conventional FIFO queue. I/O bus target control 445 either places a request in queue 430 or retries the request. If the request is retried, a retry response is issued to the originating agent on I/O bus 402 informing that agent that it must retry the request at a later time.

In one embodiment of the present invention, each slot of inbound request queue 430 includes a tag field. This tag field indicates information such as whether bridge 400 committed to the transaction in a particular slot.

Target control 445 determines whether to retry the request or place it into inbound request queue 430 based on input from inbound queue allocation unit 425 and transaction arbitration unit (TAU) 418. Inbound queue allocation unit 435 monitors the number of slots available in inbound request queue 430. If a slot is available, then target control 445 places the request into queue 430 if TAU 418 issues a grant for the request; if a slot is not available then target control 445 retries the request.

In one embodiment of the present invention, TAU 418 includes a priority state machine 421, outbound posting enable state machine 422, inbound posting enable state machine 423, and retry register 424. Priority state machine 421 is used by TAU 418 in determining whether to issue a grant for a request, as discussed in more detail below with reference to FIG. 9. Outbound posting enable state machine 422 determines whether posting to outbound request queue 420 is enabled or disabled, as discussed in more detail below with reference to FIG. 7. Inbound posting enable state machine 423 determines whether posting to inbound request queue 430 is enabled or disabled, as discussed in more detail below with reference to FIG. 8. Retry register 424 is used by TAU 418 to monitor whether a request from processor bus 401 receives two consecutive retry replies, as described in more detail below.

Inbound request queue 430 also receives replies to deferred requests which were placed in the outbound request queue 420. These replies are received by queue 430 via deferred reply generator 440 and I/O bus master control 425. Such a reply may be, for example, the reply to a deferred read placed in queue 420.

The requests (or replies) in inbound request queue 430 are transferred to processor bus 401 via bus interface 410. When one or more transactions are pending in inbound request queue 430, queue 430 indicates this condition by sending a signal to processor state machine 417. Bus interface 410 then arbitrates for access to processor bus 401, and, upon being granted access, processor state machine 417 transfers the pending transaction(s) in queue 430 to the target agent(s) on processor bus 401.

Both inbound request queue 430 and outbound request queue 420 have data buffers associated with them. These data buffers are required by certain transactions; for example, a read request from processor bus 401 requires an inbound data buffer because it is retrieving data from I/O bus 402. An inbound data buffer allocation unit, which is included in inbound queue allocation unit 435, monitors the availability of inbound data buffers; i.e., the total number available and the number currently used. If a request requires an inbound data buffer, then TAU 418 requests one and either receives one or does not.

In one embodiment of the present invention, both outbound request queue 420 and inbound request queue 430 include bits indicating whether a particular slot contains a valid entry. These bits are termed "valid bits". So, if a particular slot in a queue contains a transaction, its valid bit is set; any slot whose valid bit is not set does not contain a valid entry.

The producer-consumer relationship required by many software algorithms, described above, should be preserved within the bus bridge. Maintaining transaction ordering within the bridge ensures that the producer-consumer relationship is preserved.

In one embodiment of the present invention, transaction ordering is maintained by disabling posting in the "opposite direction" whenever a read is being serviced. That is, if a read request is placed into outbound request queue 420, inbound posting is disabled. No requests are posted in inbound request queue 430 until inbound posting is enabled. Similarly, if a read request is placed into inbound request queue 430, outbound posting is disabled. No requests are posted in outbound request queue 420 until outbound posting is enabled.

In one embodiment of the present invention, four different types of read/write requests are supported by processor bus 401. These types are: (1) postable write requests; (2) non-postable write requests; (3) deferrable read requests; and (4) non-deferrable read requests. Postable write requests are write requests which the bridge commits to. That is, the bridge returns a commit response for the request to the originating agent even though the request is stored in the queue and has not actually been delivered to the target agent yet. Non-postable write requests are requests which can not be immediately committed to; bridge 400 stalls processor bus 401, attempts to execute the request on I/O bus 402, and delivers the response to the originating agent. Deferrable read requests are requests which the bridge issues a deferred response to. The originating agent releases the bus, knowing that bridge 400 will return the reply at some later time. Non-deferrable reads are similar to non-postable writes; bridge 400 stalls processor bus 401, attempts the request on I/O bus 402, and returns a reply to the originating agent.

In one implementation, a maximum of two read requests may be deferred. Thus, if bridge 400 receives two read requests from processor bus 401, both are deferred and enter outbound request queue 420. However, if a third read request is received from processor bus 401, that request becomes a non-deferrable read. When one of the deferred reads is attempted on I/O bus 402 and a reply is placed in inbound request queue 430, a subsequent read entering outbound request queue 420 can be deferred.

In one embodiment of the present invention, bridge 400 classifies read/write requests from I/O bus 402 into two categories: (1) non-postable requests, and (2) postable requests. Both of these categories include read requests and write requests. Non-postable requests are requests which can not be immediately committed to. Bridge 400 holds I/O bus 402 (i.e., prevents other agents on the bus from issuing requests on the bus) until the non-postable request is attempted on processor bus 401. Postable requests are requests which can be immediately committed to. These requests are placed into inbound request queue 430 and I/O bus 402 is not held.

Thus, by disabling posting in the opposite direction, bridge 400 prevents a write request from being posted in the opposite direction. As is shown in more detail below, a non-postable write request is not serviced before the read request which disabled posting is serviced. This prevents a previously issued read request from reading the data written by a subsequently issued write transaction.

TAU 418 also prevents deadlock situations from arising within bridge 400. A deadlock situation could arise, for example, if a deferred read request were at the top of outbound request queue 420, a non-deferred read request were in queue 420 behind the deferred read request, and a read request were at the top of inbound request queue 430. The read request in queue 430 would be holding I/O bus 402, thereby preventing the deferred read request in outbound request queue 420 from executing on I/O bus 402. Similarly, the non-deferred read request in queue 420 would be stalling processor bus 401, thereby preventing the read request in queue 430 from executing on processor bus 401. Thus, it can be seen that under these circumstances the bridge is deadlocked because neither queue 420 nor queue 430 can advance.

TAU 418 avoids such a deadlock situation by preventing non-postable inbound requests from entering inbound request queue 430 until outbound posting has been disabled and no outbound posted or deferred requests are pending in outbound request queue 420. Transactions entering bridge 400 from processor bus 401 are not deferred or posted until the non-postable inbound request(s) is no longer pending in inbound request queue 430. This is discussed in more detail below with reference to FIG. 9.

In one embodiment of the present invention, processor bus 401 and I/O bus 402 operate in different clock domains. In one implementation, processor bus 401 operates at 66 MHz while I/O bus 402 operates at 33 MHz. TAU 418 provides an interface between the two clock domains, allowing both outbound request decoder 415 and I/O bus target control 445 to commit or not commit to requests, based on what types of requests the other has already committed to.

When processor bus 401 and I/O bus 402 operate in different clock domains, some elements of bridge 400 operate in the clock domain of processor bus 401 and some elements operate in the clock domain of I/O bus 402. In one implementation, this division of elements between clock domains is shown in FIG. 4 by dashed line 403. The elements on the processor bus 401 side of line 403 operate in the clock domain of processor bus 401 and the elements on the I/O bus 402 side of line 403 operate in the clock domain of I/O bus 402. Signals which are transferred between elements of the two clock domains are synchronized using synchronization units. These units operate in a conventional manner to transfer signals from one clock domain to another.

For example, in one embodiment of the present invention TAU 418 and I/O bus target control 445 operate in the same clock domain as I/O bus 402, whereas decoder 415 operates in the same clock domain as processor bus 401. TAU 418 indicates to I/O bus target control 445 whether posting to inbound request queue 430 is enabled and indicates to decoder 415 whether posting to outbound request queue 420 is enabled, as discussed in more detail below. Thus, by use of these posting enable signals, both I/O bus target control 445 and decoder 415 can immediately commit to transactions in their own clock domains; synchronization is not necessary when posting is enabled in both directions.

Transactions Originating on the Processor Bus

Figure 5A:
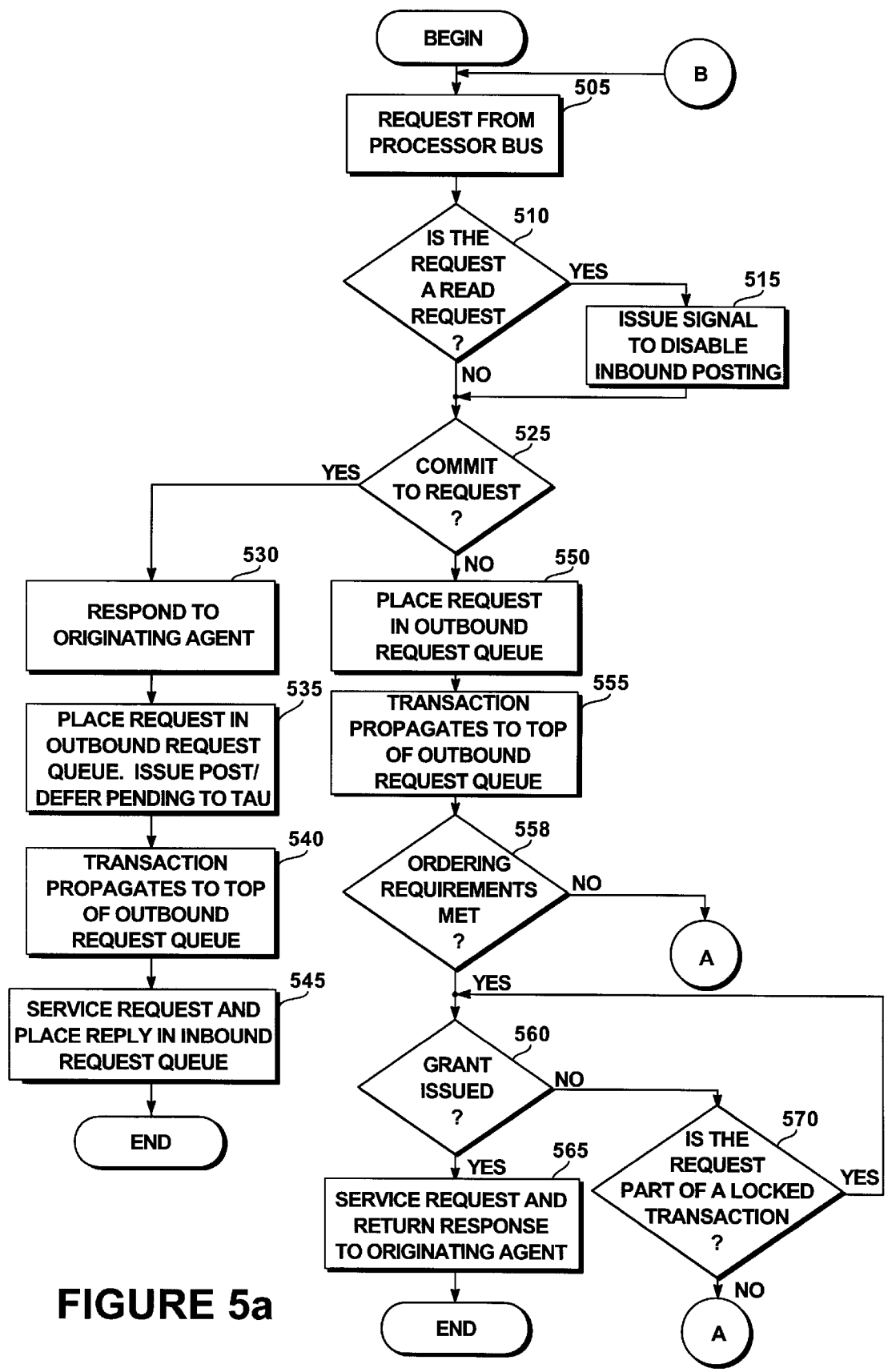
FIGS. 5a and 5b are a flowchart showing the steps followed in handling a request received on one bus by a bridge in one embodiment of the present invention.
Figure 5B:
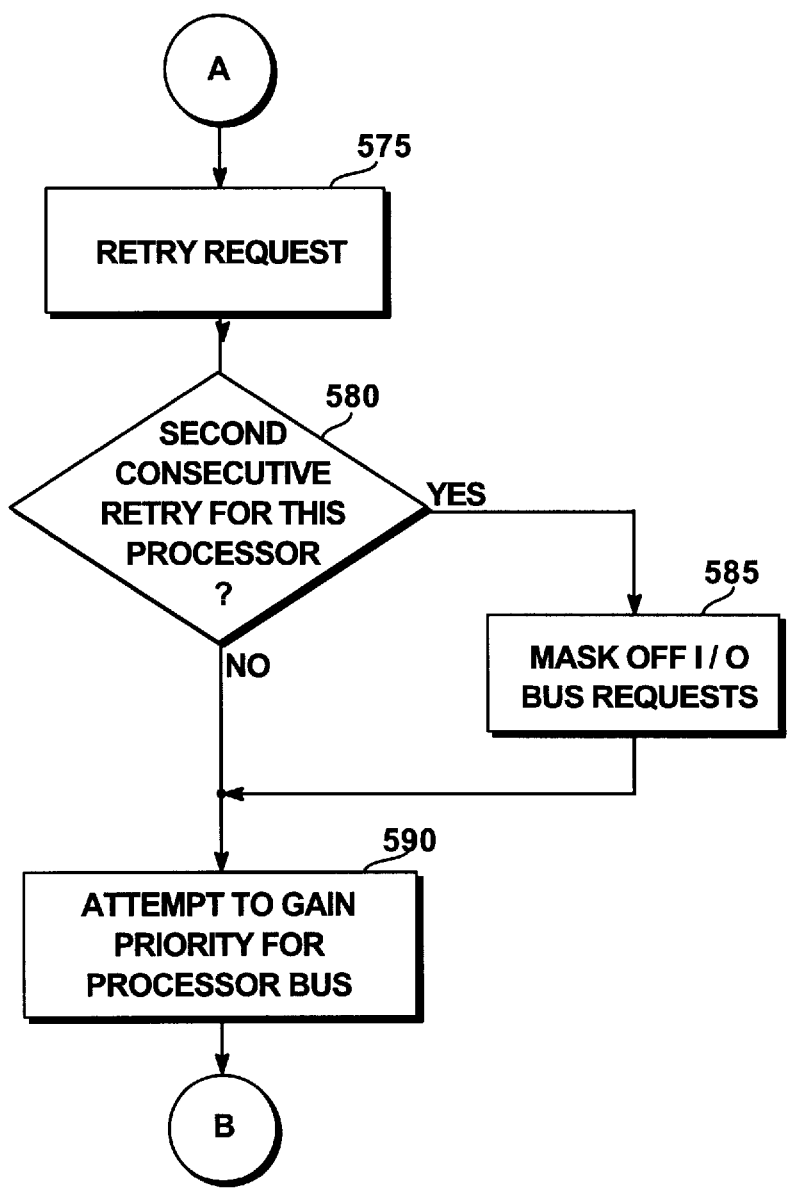

FIGS. 5a and 5b are a flowchart showing the steps followed in handling a request received by bridge 400 from processor bus 401 in one embodiment of the present invention. The request is received by bridge 400 from the originating agent on processor bus 401, step 505. It should be noted that although an agent is the originating agent on processor bus 401, that agent may not have initiated the request. For example, a request could be initiated by an agent coupled to I/O bus 242 of FIG. 2 which targets an agent on system I/O bus 231. This request originates on processor-memory bus 201 with bridge 240 and is received by bridge 224. Thus, although the originating agent on bus 201 is bridge 240, bridge 240 did not initiate the request.

Returning to FIG. 5a, upon receipt of a request from processor bus 401, bridge 400 determines whether the request is a read request, step 510. If the request is not a read request, then decoder 415 determines whether to commit to the transaction, step 525, discussed below. If the request is a read request, then decoder 415 sends a signal to TAU 418 indicating that inbound posting should be disabled, step 515. Disabling of inbound posting is described in more detail below with reference to FIG. 8.

Decoder 415 determines whether to commit to the received request, step 525. In one mode of operation, this determination is made concurrent with the signaling of TAU 418 in step 515. Determination of whether to commit to the transaction is based on an outbound posting enabled signal received from TAU 418. TAU 418, as described in more detail below, is responsible for enabling and disabling posting in both outbound request queue 420 and inbound request queue 430.

Figure 7:
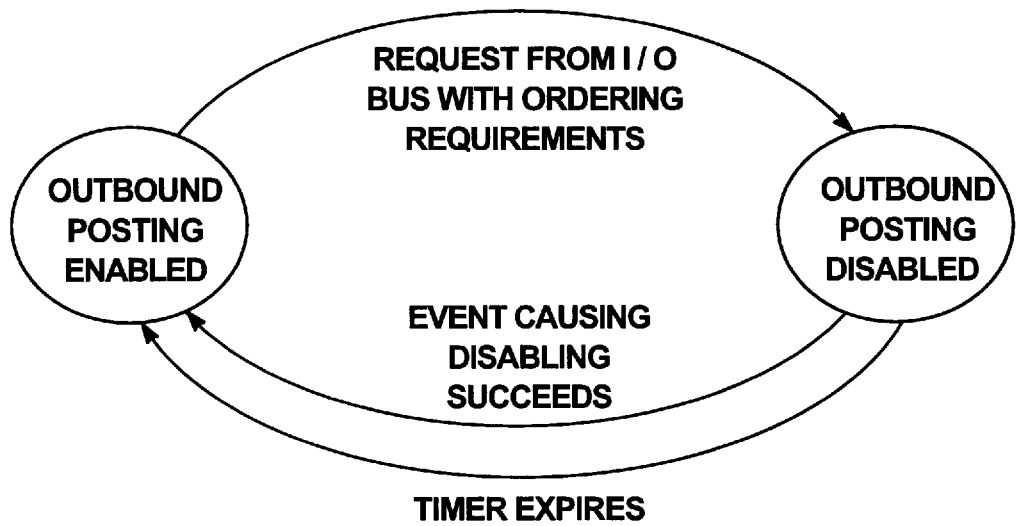
FIG. 7 shows a state diagram used in determining whether to enable or disable posting to one queue in one embodiment of the present invention.

FIG. 7 shows a state diagram followed by TAU 418 in determining whether to enable or disable posting to the outbound request queue in one embodiment of the present invention. As shown in FIG. 7, outbound posting is either enabled or disabled. In one embodiment of the present invention, outbound posting is disabled whenever a request is received from I/O bus 402 which has ordering requirements. In one implementation, read transactions are predetermined to have ordering requirements. For example, if a read request were received from I/O bus 402, outbound posting would be disabled to ensure transaction ordering is maintained.

When outbound posting is disabled, TAU 418 starts a timer running. Outbound posting remains disabled until the timer started by TAU 418 expires, or the request which started the timer succeeds. In one embodiment of the present invention, the I/O bus arbiter contains a timer which is set when a request is retried. The arbiter does not allow any requests to be issued by the retried agent until the expiration of that timer. The timer in TAU 418 is programmable and set according to this arbiter timer; the timer in TAU 418 is set to expire shortly after the timer in the I/O bus arbiter expires. TAU 418 does not commit to requests from I/O bus 402 which arrive while its timer is activated, thereby causing I/O bus target control 445 to retry these requests, as discussed in more detail below.

It should be noted that this method presumes the I/O bus arbiter operates in a fair manner. That is, the method presumes that when the I/O bus arbiter timer expires, the arbiter allows the retried agent to retry the request. Thus, if the agent does retry the request, then outbound posting remains disabled (because a request is received from I/O bus 402 with ordering requirements) and completion of the request is attempted. If the attempt succeeds, then outbound posting is enabled; if the attempt does not succeed then the request is retried and TAU 418 starts the timer again. However, if the agent does not retry the request shortly after the I/O bus arbiter expires, then TAU 418 presumes that the agent is not going to retry the request (e.g., the agent no longer needs to perform the request).

Thus, it can be seen that the use of the timer allows outbound posting to be disabled in response to a particular request on I/O bus 402. This disabling gives TAU 418 the opportunity to meet transaction ordering and deadlock avoidance requirements for the request, as described in more detail below with reference to FIG. 9. If the request comes back, then it can be attempted again. If the request does not come back, then TAU 418 re-enables outbound posting.

Returning to FIG. 5a, if TAU 418 indicates posting is enabled, then decoder 415 commits to the transaction if it is a postable or deferrable request. That is, decoder 415 returns a response to the originating agent on processor bus 401 that the request will be attempted on I/O bus 402, step 530. Decoder 415 then places the request into the outbound request queue 420, step 535.

In addition to placing the request in queue 420, decoder 415 also sends an outbound post pending signal to TAU 418, step 535. The outbound post pending signal indicates to TAU 418 that a posted (or deferred) transaction is in outbound request queue 420. TAU 418 uses this signal if it receives a request from I/O bus 402 which requires the outbound request queue to be flushed, as described in more detail below.

Transactions placed in outbound request queue 420 propagate to the top of the queue, step 540. When a committed transaction is at the top of the queue, the request is removed and attempted on I/O bus 402 via I/O bus master control 425 and I/O bus interface 450, step 545. I/O bus master control 425 attempts the request on I/O bus 402 by requesting a grant from TAU 418. Since the transaction was committed in step 525, the requirements for TAU 418 to issue a grant (and transition to Processor Bus Priority state) should be met and a grant should therefore be issued. These requirements are discussed in more detail below with reference to FIG. 9. Upon receipt of a reply from the target agent on I/O bus 402, I/O bus master control 425 places the reply into inbound request queue 430 via deferred reply generator 440, if the transaction was deferred.

In the event of a non-deferred transaction, bridge 400 has already committed to the transaction (in step 530), and the reply information has already been returned to the originating agent on processor bus 401. Thus, if the transaction is given a retry from the target agent on I/O bus 402, I/O bus master control 425 continues to attempt the transaction until a successful completion response is received.

Returning to step 525, if the outbound posting enabled signal received from TAU 418 indicates posting is disabled, or the request is a non-postable or non-deferrable request, then decoder 415 places the request into outbound request queue 420, step 550. If posting is not enabled then bridge 400 does not commit to the transaction; rather, bus interface 410 stalls the Response Phase of processor bus 401 until the request can be attempted on I/O bus 402 and a reply returned to the originating agent.

A request placed in queue 420 propagates to the top of the queue, step 555. I/O bus master control 425 removes the request from the top of queue 420 and attempts to execute the request on I/O bus 402. Whether I/O bus master control 425 is able to execute the request on I/O bus 402 is dependent on two factors: first, whether ordering requirements are satisfied (step 558), and second, whether TAU 418 gives bus master control 425 a grant to service the request (step 560). With the first factor, bus master control 425 determines whether ordering requirements are satisfied, step 558. In one implementation, this is determined by a signal received from TAU 418 indicating that inbound posting is disabled. If ordering requirements are not satisfied, then the request is given a retry reply, step 575 of FIG. 5b, as discussed in more detail below.

If ordering requirements are satisfied, then execution of the request is dependent on whether TAU 418 gives bus master control 425 a grant to service the request, step 560, in response to I/O bus master control 425 requesting a grant In one implementation, three different grant requests may be made by I/O bus master control 425, indicating whether the request is a non-deferred read request, a deferred request, or a non-posted write request. It should be noted that I/O bus master control 425 deasserts this signal when either the request has been attempted on I/O bus 402, or a no-grant is received from TAU 418.

Figure 9:
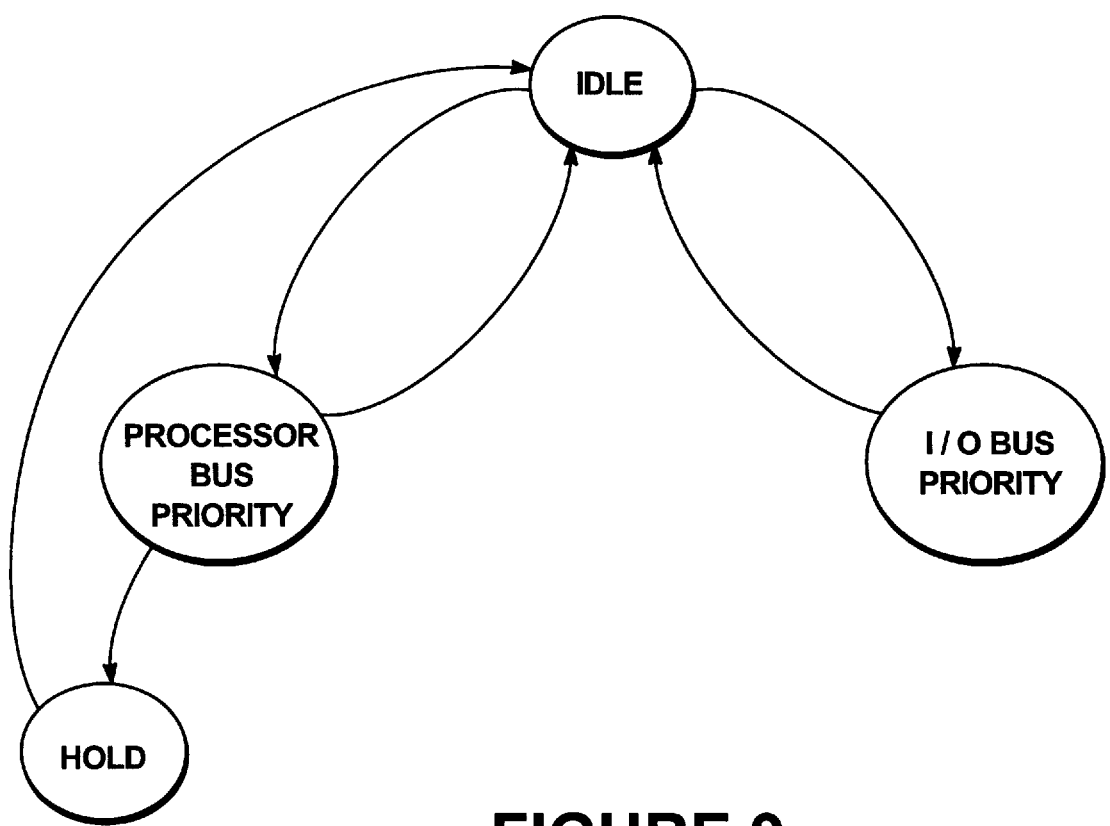
FIG. 9 shows a state diagram used in determining whether to issue a grant or no-grant signal to service requests in one embodiment of the present invention.

FIG. 9 shows a state diagram of TAU 418 used in determining whether to give bus master control 425 a grant or no-grant to service the request. If TAU 418 is in the Idle state, then TAU 418 proceeds to attempt to gain priority for processor bus 401, as described in more detail below. If TAU 418 is in the I/O Bus Priority state, then TAU 418 issues a no-grant to all requests from processor bus 401. However, if TAU 418 is in the Processor Bus Priority state, then TAU 418 issues a grant to the request.

In order to give a grant to bus master control 425, TAU 418 must transition from Idle state to Processor Bus Priority state. In order to make this transition, four conditions must be met: (1) ordering requirements must be satisfied; (2) deadlock avoidance criteria must be satisfied; (3) an inbound data buffer must be available, if needed; and (4) TAU 418 must have ownership of I/O bus 402. If TAU 418 is able to transition to Processor Bus Priority state, then it issues a grant to bus master control 425; otherwise, it issues a no-grant.

First, transaction ordering requirements must be satisfied. In one embodiment of the present invention, transaction ordering requirements are satisfied when inbound posting is disabled, as discussed above.

Second, deadlock avoidance criteria must be satisfied. In one embodiment of the present invention, deadlock avoidance criteria is satisfied by "flushing" the inbound request queue. That is, TAU 418 determines that no posted transactions exist in inbound request queue 430. TAU 418 makes this determination based on an inbound posting pending signal received from I/O bus target control 445 when a transaction is posted in the inbound queue. I/O bus target control 445 asserts the inbound posting pending signal so long as the valid bit of at least one slot of the inbound request queue 430 is set; when all valid bits are cleared (by having the requests in inbound request queue 430 being popped off), I/O bus target control 445 deasserts the inbound posting pending signal. In order to satisfy the deadlock avoidance criteria, the inbound posting pending signal must be deasserted.

Third, an inbound data buffer must be available, if necessary. Certain transactions require the use of an inbound data buffer. If the request that bus master control 425 is attempting to service requires an inbound data buffer, then TAU 418 does not issue a grant to bus master control 425 unless a buffer is available. Issuing a grant without a buffer available would result in no storage location in which to place the data associated with the request. Bus master control 425 informs TAU 418 that the request requires a data buffer by asserting a signal to TAU 418 when it requests a grant to service the request in step 560. In one embodiment of the present invention, TAU 418 requests an inbound data buffer from allocation unit 435 when a request requires an inbound data buffer, and allocation unit 435 returns either a grant or no-grant signal to TAU 418, indicating availability or non-availability of a buffer, respectively. In one implementation, allocation unit 435 also indicates the identity (e.g., the address) of a data buffer for TAU 418 to use when issuing a grant signal to TAU 418.

Fourth, TAU 418 must have ownership of I/O bus 402. In this embodiment of the present invention, TAU 418 arbitrates for access to I/O bus 402. In one implementation, TAU 418 arbitrates for access to I/O bus 402 via arbitration unit 451 of I/O bus interface 450. If the above three conditions are met, then when TAU 418 obtains ownership of I/O bus 402 from the I/O bus arbiter, the grant can be issued. By waiting until ownership of I/O bus 402 is obtained, TAU 418 ensures that bus master control 425 can immediately execute the request on I/O bus 402 upon issuance of the grant from TAU 418.

In one embodiment of the present invention, TAU 418 arbitrates for access to I/O bus 402 only if the above three conditions are met. Thus, TAU 418 does not prevent other agents coupled to I/O bus 402 from obtaining ownership of I/O bus 402 unless bus master control 425 contains a transaction which is ready to be executed on I/O bus 402.

When these four conditions are met, TAU 418 transitions from Idle state to Processor Bus Priority state. While in Processor Bus Priority state, TAU 418 issues a grant signal to bus master control 425 and returns to Idle state or transitions to Hold state. TAU 418 transitions to Idle state when I/O bus master control 425 deasserts its request for a grant. Alternatively, TAU 418 may transition to Hold state, as discussed in more detail below.

In one implementation of the present invention, I/O bus master control 425 can also issue a signal to TAU 418 to request internal resources, such as inbound data buffers, without requesting ownership of I/O bus 402. This may be done, for example, where I/O bus master control 425 wants to obtain an inbound data buffer, or check if one is available, but not immediately execute a transaction on I/O bus 402.

In one embodiment of the present invention, inbound request queue 430 need not be flushed under certain circumstances. For example, one request which may be received from processor bus 401 is a frame buffer read (i.e., a read from video graphics areas). Software algorithms employing the producer-consumer model generally do not store data in the graphics areas, so the transaction ordering concerns discussed above are generally not an issue. In this embodiment, bus master control 425 issues a signal to TAU 418 when requesting a grant indicating that this request is a frame buffer read. This signal informs TAU 418 that the inbound request queue 430 need not be flushed, so if the remaining three criteria are satisfied TAU 418 can issue a grant even if posted transactions are pending in inbound request queue 430.

In one embodiment of the present invention, TAU 418 can also transition to a Hold state from the Processor Bus Priority state. While in the Hold state, TAU 418 issues a no-grant signal to requests received from I/O bus 402. Transition to the Hold state may be required under certain circumstances; for example, in one embodiment of the present invention, if a request is disconnected from I/O bus 402 before it is completed, the requesting agent (i.e., the bridge in this example) must release its bus request signal for two clocks, and then attempt to resume or re-execute the transaction. Thus, if bus master control 425 receives a grant from TAU 418 and starts to execute the request on I/O bus 402, the bridge 400 may be unexpectedly disconnected. For example, this may occur if the target agent on I/O bus 402 cannot transfer as much data as the originating agent on processor bus 401 (such as trying to transfer a 32-byte data line to an agent with only a single 4-byte data buffer). Under these circumstances, it is desirable to maintain priority with the bridge so no other requests can be given a grant while in the Hold state. TAU 418 transitions from Hold state to Idle state (in response to a hold request signal asserted by bus master control 425). However, because priority with the bridge was maintained, TAU 418 should be able to immediately transition to Processor Bus Priority state again.

Returning to FIG. 5*a*, if TAU 418 gives bus master control 425 a grant, then bus master control 425 services the request, step 565. The request is executed on I/O bus 402 via bus interface 450 (recall that TAU 418 already arbitrated for and received access to I/O bus 402). Bus master control 425 receives a reply from the target agent on I/O bus 402, which is returned to the originating agent on processor bus 401 via bus interface 410. The reply is not returned through inbound request queue 430 because bridge 400 is stalling processor bus 401 waiting for this reply.

Returning to step 560, if TAU 418 gives bus master control 425 a no-grant, then bus master control 425 determines whether the request is part of a lock operation, step 570. A lock operation is an operation on the bus which must remain indivisible; the operation typically involves a read transaction and a write transaction, one or both of which may pass through bridge 400. In one embodiment of the present invention, an agent on processor bus 401 which issues a lock transaction issues a lock signal along with the transaction which is received by bridge 400 via interface 410. Thus, bridge 400, and therefore bus master control 425, knows the transaction is a lock transaction. In one embodiment of the present invention, whether a transaction is part of a lock transaction is stored in a tag field associated with the transaction in outbound request queue 420.

If the request is part of a lock operation, then bus master control 425 knows the request must be completed. The failure to receive a grant to service the request from TAU 418 indicates that a transaction was placed into the inbound request queue 430 after bridge 400 received this lock request but before the lock request propagated to the top of outbound request queue 420. When the request in the inbound queue 430 propagates to the top of queue 430, processor state machine 417 observes that a lock transaction is in progress on processor bus 401 and will issue a retry for the request, as discussed in more detail below. Thus, for a request which is part of a lock operation, bus master control 425 knows it will eventually receive a grant from TAU 418. Bus master control 425 therefore continues to request a grant from TAU 418 until a grant is received, shown by repeating steps 560 and 570.

If the request at the top of outbound request queue 420 is not part of a lock operation, then the request is given a retry reply, step 575 of FIG. 5*b*. This retry reply is returned to the originating agent immediately, as the Response Phase of processor bus 401 is being stalled.

In addition to issuing a retry, TAU 418 determines whether this retry is the second consecutive retry reply for this processor, step 580. In one embodiment of the present invention, this information is stored in a retry register 424 which includes the agent ID and whether this ID was previously retried. This register is cleared when a subsequent transaction requests a grant from TAU 418. If this is the second consecutive retry, then TAU 418 presumes this is due to the fact that the request keeps being retried due to transactions being placed in inbound request queue 430 receiving priority. In order to prevent starvation of the agent on processor bus 401, TAU 418 masks off requests from I/O bus 402, step 585. That is, I/O requests are given retry responses until this outbound request is given priority (or a subsequent request is received from a different processor). Thus, the next request by this processor should be given priority. It should be noted that this masking off of requests from I/O bus 402 should allow this agent access to I/O bus 402; however, there is no guarantee that the target agent on I/O bus 402 will not issue a retry response for the request.

It will be appreciated that the masking off of requests from I/O bus 402, as shown in steps 580 and 585, is not necessary to the operation of the present invention. That is, in one implementation, after the request is given a retry reply in step 575, TAU 418 attempts to gain priority for processor bus 401 in step 590, discussed below.

Regardless of whether requests on I/O bus 402 are masked off, TAU 418 attempts to gain priority for processor bus 401, step 590. This attempt to gain priority is as described above with reference to FIG. 9. TAU 418 attempts to meet those conditions so that when the request is retried and again propagates to the top of outbound request queue 420, a grant can be issued to service the request. It should be noted, however, that TAU 418 does not arbitrate for access to I/O bus 402 until bus master control 425 again requests a grant to service the request.

The agent which placed the request on processor bus 401 then attempts the request again, step 505 of FIG. 5*a*. The above steps are repeated, with the request either being serviced on I/O bus 402 or retried again.

Transactions Originating on the I/O Bus

Figure 6A:
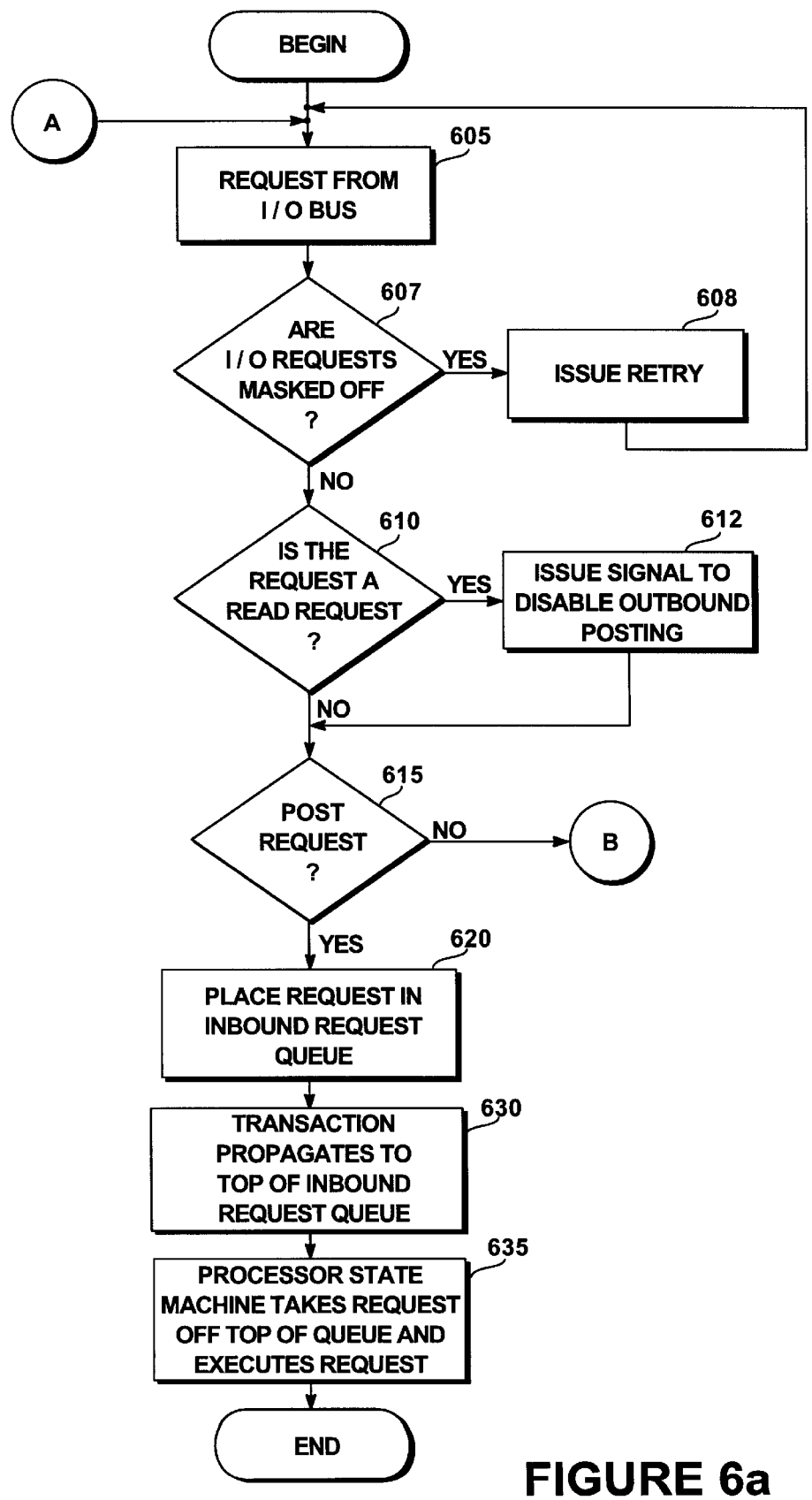
FIGS. 6a and 6b are a flowchart showing the steps followed in handling a request received on a second bus by a bridge in one embodiment of the present invention.
Figure 6B:
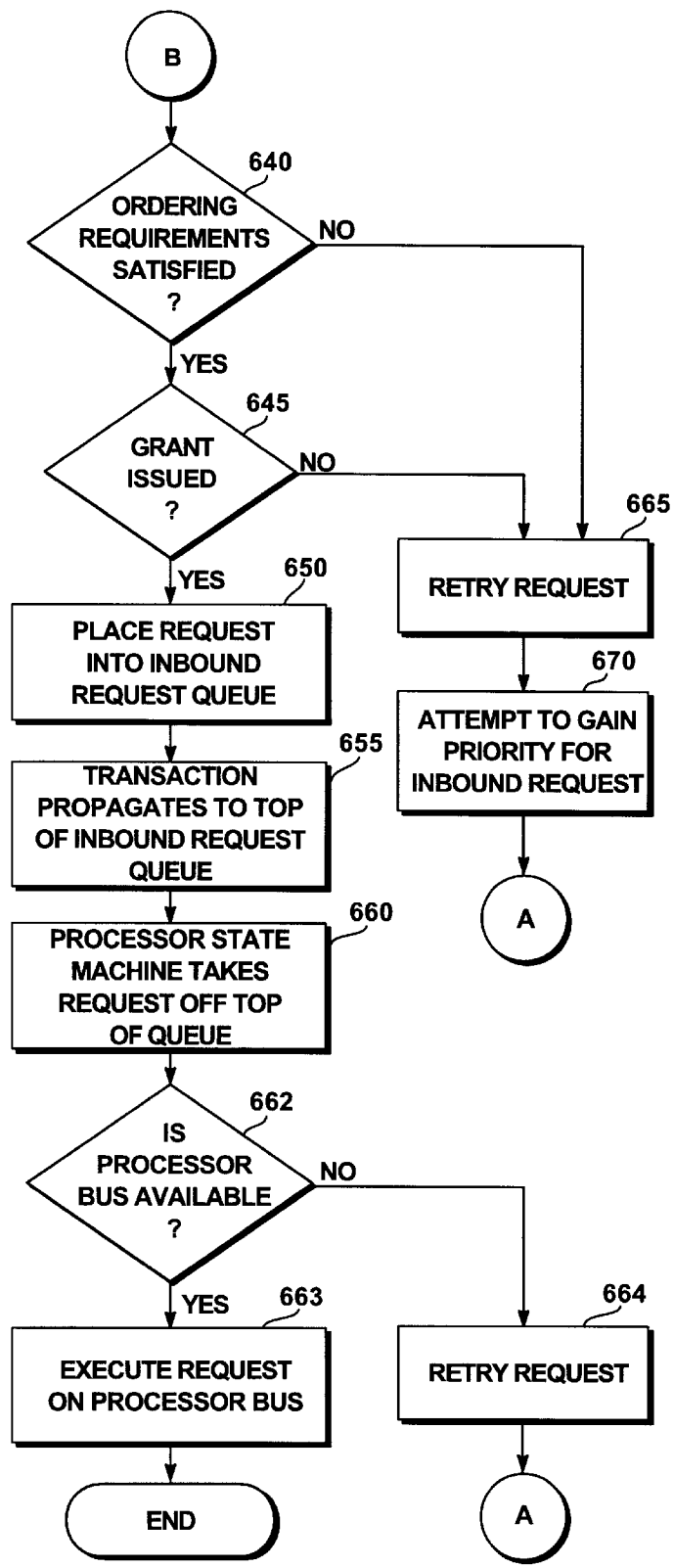

FIGS. 6*a* and 6*b* are a flowchart showing the steps followed in handling a request received by bridge 400 from I/O bus 402 in one embodiment of the present invention. The request is received by bridge 400 from an originating agent on I/O bus 402, step 605. It should be noted that although the request is received from an originating agent on I/O bus 402, that agent may not have initiated the request. For example, a request could be initiated by an agent coupled to I/O bus 246 of FIG. 2 which targets an agent on processor-memory bus 201. This request originates on system I/O bus 231 with bridge 245 and is received by bridge 224. Thus, although the request originates on bus 231 with bridge 245, bridge 245 did not initiate the request.

Returning to FIG. 6*a*, upon receipt of a request from I/O bus 402, TAU 418 determines whether I/O requests are masked off, step 607. As discussed above, I/O requests would be masked off if an agent on processor bus 401 received two consecutive retry replies. If I/O requests are masked off, then TAU 418 issues a retry response for this request, step 608. This retry indicates to the originating agent that it must issue the request again at a later time.

If I/O requests are not masked off, then bridge 400 determines whether the request is a read request, step 610. In an alternate embodiment of the present invention, bridge 400 determines whether the request received has transaction ordering requirements, based on the command received (as decoded by command decode 452). If the command matches a set of predetermined commands with transaction ordering requirements, then bridge 400 knows this request has ordering requirements.

If the request is not a read request, then I/O bus target control 445 determines whether to post the request, step 615, discussed below. If the request is a read request, then target control 445 sends a signal to TAU 418 indicating that outbound posting should be disabled, step 612. Disabling of outbound posting is described above with reference to FIG. 7.

I/O bus target control 445 then determines whether to post the received request, step 615. In one implementation, only certain predetermined requests can be posted (e.g., write requests). In one embodiment of the present invention, the determination of whether to post a request is made concurrent with the signaling of TAU 418 in step 612. This determination is made based on whether inbound posting is enabled or disabled and whether an inbound queue slot is available, assuming the request is a postable request. A signal indicating whether an inbound queue slot is available is received from inbound queue allocation unit 435, as described above. If inbound posting is disabled, or an inbound queue slot is not available, or the request is not a postable request, then I/O bus target control 445 determines if ordering requirements are satisfied, step 640 of FIG. 6*b*, as discussed in more detail below.

However, if inbound posting is enabled and an inbound queue slot is available, then the response is posted and placed in inbound request queue 430, step 620. Upon being posted, the originating agent is informed that the request will be attempted on processor bus 401 (i.e., bridge 400 commits to the request); thus, the originating agent can release I/O bus 402 without waiting for a reply from the target agent on processor bus 401. Inbound posting is either enabled or disabled based on an inbound posting enabled signal received by I/O bus target control 445 from TAU 418.

Figure 8:
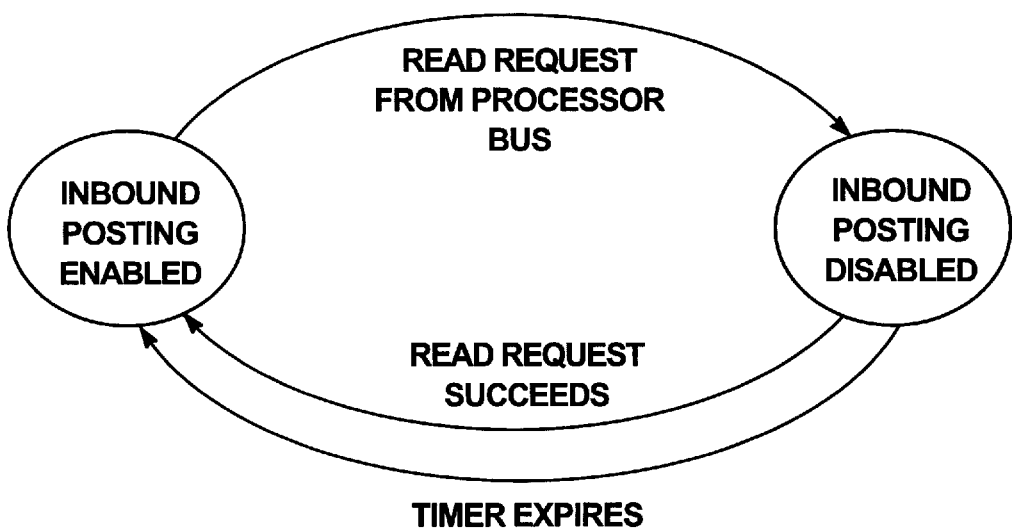
FIG. 8 shows a state diagram used in determining whether to enable or disable posting to a second queue in one embodiment of the present invention.

FIG. 8 shows a state diagram followed by TAU 418 in determining whether to enable or disable posting to inbound request queue 430 in one embodiment of the present invention. As shown in FIG. 8, inbound posting is either enabled or disabled. In one embodiment of the present invention, inbound posting is disabled whenever a read request is received from processor bus 401. Whenever inbound posting is disabled, TAU 418 starts a timer running.

Once disabled, inbound posting remains disabled until either the timer set by TAU 418 expires, or the read request causing the disabling of inbound posting succeeds. When decoder 415 receives a request, it also receives the agent identification of the agent which issued the request. Thus, decoder 415 knows when the read request which caused the disabling comes back (and it can deassert its signal that inbound posting should be disabled, assuming no other transactions have entered outbound request queue 420 which require decoder 415 to indicate inbound posting should be disabled).

TAU 418 maintains a timer similar to the timer discussed above with reference to FIG. 7 and disabling of outbound posting. This timer in TAU 418 is based on the arbitration algorithm of processor bus 401. In one embodiment of the present invention, the arbitration algorithm on processor bus 401 follows a round-robin policy. Thus, the maximum amount of time before a processor could retry a request can be determined. By setting the TAU 418 timer to this maximum amount of time, TAU 418 ensures that inbound posting is not disabled before the retried agent has the opportunity to retry the request.

Under certain circumstances, the agent which caused the disabling could retry the request prior to the expiration of the timer within TAU 418. In this situation, inbound posting remains disabled until the request succeeds. If the request is retried, then the timer is reset and starts again. If the request succeeds, then disabling of the inbound request queue is no longer necessary and inbound posting is enabled.

Returning to FIG. 6a, target control 445 posts the request if possible and places the request in inbound request queue 430, step 620. As with the outbound request queue, transactions in the inbound request queue propagate to the top of the queue, step 630. Processor state machine 417 retrieves the request from the top of the inbound request queue and executes it, step 635.

In one embodiment of the present invention, the execution of the request on processor bus 401 results in one of two possible responses. First, a successful completion response may be returned from the target agent on processor bus 401. In this situation, the transaction is completed, as the posted response from step 620 indicated to the originating agent on I/O bus 402 that the transaction would be completed. The second possible response is a retry reply. In this situation, the target agent on processor bus 401 issues a retry to the request, indicating it is not ready to service the request and it must therefore be retried. Bridge 400 receives this retry reply, and continues to retry the request until a successful completion response is received.

Returning to step 615 of FIG. 6a, if the request is not posted, then target control 445 determines whether ordering requirements for the request are satisfied, step 640 of FIG. 6b. In one implementation, this is determined by a signal received from TAU 418 indicating that outbound posting is disabled. If ordering requirements are not satisfied, then the request is given a retry reply, as discussed below in step 665.

If, however, ordering requirements are satisfied, then I/O bus target control 445 determines whether a grant or no-grant is received from TAU 418, in response to a grant request from I/O bus target control 445, step 645. Whether TAU 418 issues a grant is described in more detail below, with reference to FIG. 9. In one implementation, the grant request target control 445 issues to TAU 418 indicates the request is a non-postable request. I/O bus target control 445 releases its grant request when either a no-grant signal is received from TAU 418, or the request is completed. If a slot is available in inbound request queue 430 and a grant signal is received, then target control 445 places the request into inbound request queue 430, step 650. The request then propagates to the top of inbound request queue 430, step 655. Processor state machine 417 retrieves the requests from the top of the inbound request queue and attempts to execute it, step 660. In attempting to execute the request on processor bus 401, processor state machine 417 determines whether processor bus 401 is available, step 662. If the bus is available, then processor state machine 417 executes the transaction on processor bus 401, step 663.

Upon being executed on processor bus 401, the request could receive a retry reply from the targeted agent or a successful completion reply. This reply is returned to the originating agent on I/O bus 402, which is waiting for a reply (i.e., the originating agent on I/O bus 402 is preventing other agents on I/O bus 402 from issuing requests on I/O bus 402).

Returning to step 662, under certain circumstances processor bus 401 may not be available. For example, as discussed above, a transaction could be in outbound request queue 420 which is part of a lock operation. In this situation, processor bus 401 would be unavailable. When processor bus 401 is unavailable, processor state machine 417 returns a retry response to the agent issuing the request, step 664. Thus, the agent must try the request again at a later time, thereby allowing the lock operation to complete.

Returning to step 645, if a slot is not available or a no-grant signal is received, then the request is retried, step 665. If TAU 418 issues a no-grant signal, then TAU 418 attempts to get priority for the inbound request, step 670, as described in more detail below. The agent issuing the request then retries the request at a later time, step 605 of FIG. 6a.

FIG. 9 shows a state diagram of TAU 418 used in determining whether to give target control 445 a grant or no-grant to service the request. If TAU 418 is in the Idle state, then TAU 418 proceeds to attempt to gain priority for I/O bus 402, as described in more detail below. If TAU 418 is in the Processor Bus Priority state, or Hold state, then TAU 418 issues a no-grant to requests from I/O bus 402. However, if TAU 418 is in I/O bus 402 Priority state, then TAU 418 issues a grant to the request.

In order to give a grant to target control 445, TAU 418 must transition from Idle state to I/O Bus Priority state. In order to make this transition, three conditions must be met, analogous to the discussion above regarding transitioning from Idle state to Processor Bus Priority state: (1) outbound posting must be disabled; (2) the outbound request queue must be flushed; and (3) an inbound data buffer must be available, if needed. Note that it is not necessary to obtain ownership of I/O bus 402 because the requesting agent already has ownership.

First, outbound posting must be disabled. Outbound posting is disabled as discussed above with reference to FIG. 7.

Second, the outbound request queue must be flushed, i.e., the outbound request queue does not contain any posted transactions. TAU 418 makes this determination based on an outbound post pending signal received from decoder 415 when a transaction is posted in the outbound queue. In one embodiment of the present invention, decoder 415 maintains a counter which it increments each time it posts or defers a request. I/O bus master control 425 then decrements this counter each time it completes a posted or deferred requests. Thus, decoder 415 deasserts the outbound post pending signal when this counter value is zero, and asserts the outbound post pending signal when this counter has a positive value. As discussed above, in one implementation of the present invention, decoder 415 and I/O bus master control 425 operate in two different clock domains; thus, a signal from I/O bus master control 425 to decoder 415 indicating to decrement the counter passes through a synchronizing unit. TAU 418 knows the outbound queue is flushed when the outbound post pending signal is deasserted.

Third, an inbound data buffer must be available, if necessary. Certain transactions require the use of an inbound data buffer. For example, a write request requires an inbound data buffer because it is transferring data from I/O bus 402. If the request that target control 445 is attempting to service requires an inbound data buffer, then TAU 418 does not issue a grant to target control 445 unless a buffer is available. Issuing a grant without a buffer available would result in no storage location in which to place the data associated with the request. Target control 445 informs TAU 418 that the request requires a data buffer by asserting a signal to TAU 418 when it requests a grant to service the request in step 655. The requesting of an inbound data buffer by TAU 418 is as discussed above.

When these three conditions are met, TAU 418 transitions from Idle state to I/O Bus Priority state. While in I/O Bus Priority state, TAU 418 issues a grant signal to target control 445. Upon completion of the request (as indicated by the deassertion of the request for a grant by I/O bus target control 445), TAU 418 returns to Idle state.

Thus, it can be seen from the above description that the bridge transfers, requests in both directions between processor bus 401 and I/O bus 402. TAU 418 monitors the activity of both queues. When posting is enabled in both directions, the two queues operate independent of each other. When the queues operate dependent on each other, TAU 418 preserves transaction ordering and avoids deadlock situations.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for maintaining transaction ordering and arbitrating in a bus bridge has been described.

What is claimed is:

1. A bridge coupled to a first bus and a second bus, the bridge comprising:
    a first queue to transfer a first transaction from the first bus to the second bus;
    a second queue to transfer a second transaction from the second bus to the first bus; and
    a first control logic coupled to the first queue and the second queue, the first control logic to determine, based on whether posting to the second queue is disabled, whether the first transaction is to be placed in the first queue.

2. The bridge of claim 1, wherein the first control logic is also to determine whether the first transaction is to be placed in the first queue based on whether the second queue contains no posted transactions.

3. The bridge of claim 1, further comprising:
    a second control logic coupled to the first queue and the second queue, the second control logic to determine, based on whether posting to the first queue is disabled, whether the second transaction is to be issued on the first bus.

4. A computer system comprising:
    a first bus;
    a second bus;
    a first agent coupled to the first bus;
    a second agent coupled to the second bus; and
    a bus bridge coupled to the first bus and the second bus, the bus bridge including,
        a first queue to transfer a first transaction from the first agent to the second bus;
        a second queue to transfer a second transaction from the second agent to the first bus; and
        a first control logic coupled to the first queue and the second queue, wherein the first control logic is to determine, based on whether posting to the second queue is disabled, whether the first transaction is to be placed in the first queue.

5. The computer system of claim 4, wherein the first control logic is also to determine whether the first transaction is to be placed in the first queue based on whether the second queue contains no posted transactions.

6. The computer system of claim 4, further comprising:
    a second control logic coupled to the first queue and the second queue, wherein the second control logic is to determine, based on whether posting to the first queue is disabled, whether the second transaction is to be issued on the first bus.

7. A method of performing transaction arbitration in a bus bridge, the bus bridge being coupled to a first bus and a second bus, the bus bridge having a first queue and a second queue, the method comprising the steps of:
    (a) determining whether a first transaction from a first requesting agent on the first bus is to be committed to the first queue and, if so, giving an indication to the first requesting agent that the bus bridge has committed to the first transaction; and
    (b) determining whether a second transaction from a second requesting agent on the second bus is to be committed to the second queue and, if so, giving an indication to the second requesting agent that the bus bridge has committed to the second transaction.

8. The method of claim 7, further comprising the step of:
    (c) determining whether a transaction in the first queue is to be executed on the first bus or a transaction in the second queue is to be executed on the second bus.

9. The method of claim 8, wherein the determining step (c) includes the steps of:
    determining whether posting to the second queue is enabled;
    determining whether the second queue contains a posted transaction; and
    determining whether ownership of the second bus is available.

10. The method of claim 9, wherein the determining step (c) includes the step of determining that a transaction in the first queue is to be executed on the second bus when the posting to the second queue is disabled, the second queue contains no posted transaction, and ownership of the second bus is available.

11. The method of claim 8, wherein the determining step (c) includes the steps of:
    determining whether posting to the first queue is enabled; and
    determining whether the first queue contains posted transactions.

12. The method of claim 11, wherein the determining step (c) includes the step of determining that a transaction in the second queue is to be executed on the first bus when the posting to the first queue is disabled and the first queue contains no posted transactions.

13. An apparatus to be coupled to a first bus and a second bus, the apparatus comprising:
    a first queue to transfer a first transaction from the first bus to the second bus;
    a second queue to transfer a second transaction from the second bus to the first bus; and
    a first control logic coupled to the first queue and the second queue, the first control logic to determine, based on whether posting to the second queue is disabled, whether to commit to the first transaction.

14. The apparatus of claim 13, wherein the first control logic is further operative to commit to the first transaction provided posting to the second queue is disabled.

15. The apparatus of claim 14, wherein the first control logic is further operative to place the first transaction in the first queue provided the first transaction is committed to.

16. The apparatus of claim 14, further comprising:
    second control logic operative to execute the first transaction on the second bus provided the first transaction is committed to.

17. A method of transferring transactions between a first bus and a second bus via a bus bridge, wherein the bus bridge includes a first queue to transfer a first transaction from the first bus to the second bus and a second queue to transfer a second transaction from the second bus to the first bus, the method comprising the steps of:

identifying whether posting to the second queue is disabled; and determining whether to commit to the first transaction based on whether posting to the second queue is disabled.

18. The method of claim 17, further comprising the steps of:

committing to the first transaction provided posting to the second queue is disabled.

19. The method of claim 18, further comprising the step of:

placing the first transaction into the first queue provided the first transaction is committed to.

20. The method of claim 18, further comprising the steps of:

executing the first transaction on the second bus provided the first transaction is committed to.

21. A method of transferring transactions between a first bus and a second bus via a bus bridge, wherein the bus bridge includes a first queue to transfer a first transaction from the first bus to the second bus and a Second queue to transfer a second transaction from the second bus to the first bus, the method comprising the steps of:

determining whether ordering requirements for the first transaction have been satisfied;

determining whether a grant has been received for the first transaction from an arbitration unit of the bus bridge; and executing the first transaction on the second bus in response to the ordering requirements for the first transaction being satisfied and the grant being received for the first transaction.

22. The method of claim 21, wherein the step of determining whether ordering requirements for the first transaction have been satisfied comprises determining whether posting to the second queue has been disabled.

23. The method of claim 21, further comprising the step of the arbitration unit determining whether to issue the grant based on whether posting to the second queue has been disabled and whether the, second queue has been flushed.

24. The method of claim 21, further comprising the step of the arbitration unit determining whether to issue the grant based on whether the second queue has been flushed and whether ownership of the second bus is available.

25. An apparatus to transfer data between a first bus and a second bus, the apparatus comprising:

a first queue to transfer a first transaction from the first bus to the second bus;

a second queue to transfer a second transaction from the second bus to the first bus;

first logic, coupled to the first and second queues, to determine whether ordering requirements for the first transaction have been satisfied;

an arbitration unit, coupled to the first logic, to conditionally issue a grant to the first logic; and second logic, coupled to the first logic, to execute the first transaction on the second bus in response to the ordering requirements for the first transaction being satisfied and the grant being issued for the first transaction.

26. The apparatus of claim 25, wherein the first logic is operative to determine whether ordering requirements for the first transaction have been satisfied based on whether posting to the second queue has been disabled.

27. The apparatus of claim 25, wherein the arbitration unit is operative to determine whether to issue the grant based on whether posting to the second queue has been disabled and whether the second queue has been flushed.

28. The apparatus of claim 25, wherein the arbitration unit is operative to determine whether to issue the grant based on whether the second queue has been flushed and whether ownership of the second bus is available.

\* \* \* \* \*

UNITED STATES PATENT AND TRADEMARK OFFICE
CERTIFICATE OF CORRECTION

PATENT NO.    : 5,835,739
DATED         : November 10, 1998
INVENTOR(S)   : Bell et al.

It is certified that error appears in the above-identified patent and that said Letters Patent is hereby corrected as shown below:

Column 1,
Line 22, delete "modem" and insert -- modern --.

Signed and Sealed this

Tenth Day of June, 2003

JAMES E. ROGAN
*Director of the United States Patent and Trademark Office*